June 15, 1948.    C. A. MOELLER    2,443,192
AUTOMATIC PILOT FOR ROTARY WING AIRCRAFT
Filed June 12, 1945    3 Sheets-Sheet 1

C. A. MOELLER
INVENTOR

BY *Gifford L. Holmes*
AGENT

June 15, 1948.  C. A. MOELLER  2,443,192
AUTOMATIC PILOT FOR ROTARY WING AIRCRAFT
Filed June 12, 1945  3 Sheets-Sheet 2

C. A. MOELLER
INVENTOR
BY *Gifford S. Holmes*
AGENT

June 15, 1948. C. A. MOELLER 2,443,192
AUTOMATIC PILOT FOR ROTARY WING AIRCRAFT
Filed June 12, 1945 3 Sheets-Sheet 3

C. A. MOELLER
INVENTOR
BY Gifford S. Holmes
AGENT

Patented June 15, 1948

2,443,192

UNITED STATES PATENT OFFICE 2,443,192

AUTOMATIC PILOT FOR ROTARY WING AIRCRAFT

Constand A. Moeller, New Haven, Conn., assignor to United Aircraft Corporation, East Hartford, Conn., a corporation of Delaware Application June 12, 1945, Serial No. 599,005

9 Claims. (Cl. 244—17)

1

The present invention relates to automatic control and stabilizing means for rotary wing aircraft, and more particularly to an automatic pilot and referencing mechanism for a helicopter.

It is an object of the present invention to provide indicating and flying aid means for rotary wing aircraft.

It is a further object to provide mechanism for obtaining a reference between a part of a rotary wing aircraft and one or more positions in space for aiding the pilot in operating the craft, and for automatically controlling the craft when desired.

The foregoing and other objects will be either obvious or pointed out in the following specification and claims, in view of the accompanying drawings, in which Fig. 1 is an external view of a helicopter showing my invention therein in dotted lines;

Figure 1:
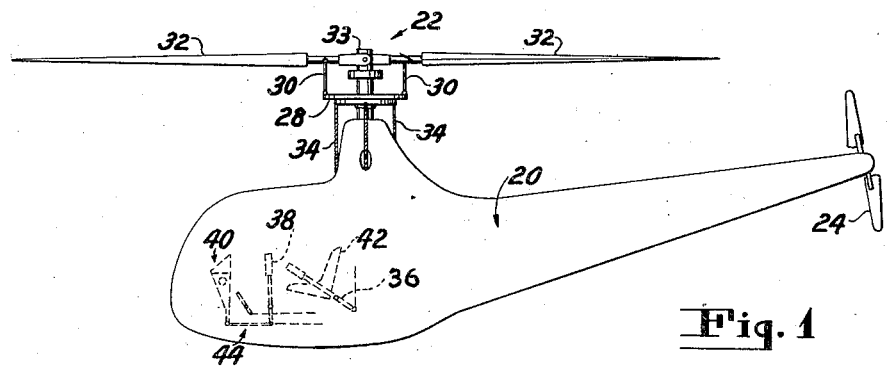

A helicopter, when in flight, may encounter different conditions and attitudes because of the fact that the sustaining rotor (or rotors) is used to propel the craft. In normal translational flight, the tip path plane of the rotor is tilted so that a horizontal component of force exerted by the rotor will propel the craft in any direction. The position in space that the tip path plane takes will correspond, or be in relationship, to the position of a part or parts of the helicopter. In other words, the tip path plane becomes tilted with respect to the fuselage of the craft and also with respect to the drive shaft to the rotor carried by the fuselage, and also with respect to the horizon.

However, in all helicopters and other rotary wing aircraft, it is not always the case that fixed parts of the craft bear a uniform relationship to the tip path plane of the rotor. It has been found, however, that the position in space of

2 the manual control stick for controlling the attitude of the craft both longitudinally and laterally bears a definite relationship to the attitude of the tip path plane in space. Thus, when the control stick is moved forwardly, the tip path plane will be inclined forwardly. As the control stick is moved backwardly, the tip path plane will be inclined backwardly and a rearward force will act upon the craft. Likewise, as the stick is moved to the right or to the left, the tip path plane will be inclined toward the right or left as the case may be. This is true both for helicopters which fly level and for those which tilt in space.

When a helicopter is flying, it may encounter fog or clouds, and may fly at night, or encounter other conditions in which poor visibility prevails. At such time, it is necessary for the pilot to know the attitude of the sustaining rotor or rotors with respect to the earth. In the present invention, use is made of the fact that the movement of the control stick has a relationship with the change of attitude of the tip path plane of the rotor. This relationship may be modified for different speeds, and location of the center of gravity of the craft to a certain extent. Automatic control means and indicating means are connected with the control stick to either control the attitude of the tip path plane and hence the attitude of the craft, or to indicate the attitude so that the pilot may correct the attitude of his craft in accordance with the referencing means. As will be pointed out more fully hereinafter, the tip path plane also tilts with respect to the fuselage, and the foregoing is not intended to limit my invention to control of helicopters, or the like, from the control stick alone.

In the present invention, a gyroscopic horizon is used to indicate the vertical position, and a directional gyroscope is used to indicate direction. However, it will be understood that other vertical indicating means such as a pendulum could be used, and a compass could be used to indicate direction. It would be further obvious to employ radio direction indicating means to control direction or to indicate vertical. Also, because a helicopter is capable of hovering in a fixed position in the air, sonic means could be used to indicate position with respect to the earth as well as the distance to the earth.

Referring now to Fig. 1, a helicopter 20 is shown diagrammatically, but it should be understood that other types of rotary wing aircraft could be likewise controlled by the mechanism to be described hereinafter. The helicopter 20 has a rotor 22 driven by an engine, not shown. The rotor could be turned by other means such as jet propulsion, for example, or be driven by the relative wind. A torque compensating rotor 24 is mounted upon the empennage portion of the helicopter 20. A control mechanism 26 comprises a tilt plate 28 and rods 30 connected to the rotor blades 32 to control the pitch and angle of attack of the rotor blades 32. Control means 34 are connected to the tilt plate 28 and extend down into the body of the helicopter 20. Although many different forms of control mechanism are known, that type illustratively used here can tilt the plate 28 to vary the angle of attack of the blades 32 cyclically and may also be moved simultaneously up and down to control the total pitch of the blades 32 for changing the lift of the rotor 22. The total pitch function is controlled by a control lever 36 through suitable connections, not shown. Inasmuch as the operation of the instant invention does not depend directly upon the total pitch setting, this function will not be described. Reference may be had to U. S. application Ser. No. 592,862 of Igor I. Sikorsky for a detailed explanation thereof.

The attitude of the helicopter and the direction of its movements are controlled by a control stick 38 through connections (see Fig. 2) to the control means 34. These connections may be compression-tension rods, cables, or hydraulic connections as desired without departing from the spirit of the present invention. A cable type of control will be described hereinafter for purposes of illustrating one method of practicing the instant invention.

Figure 2:
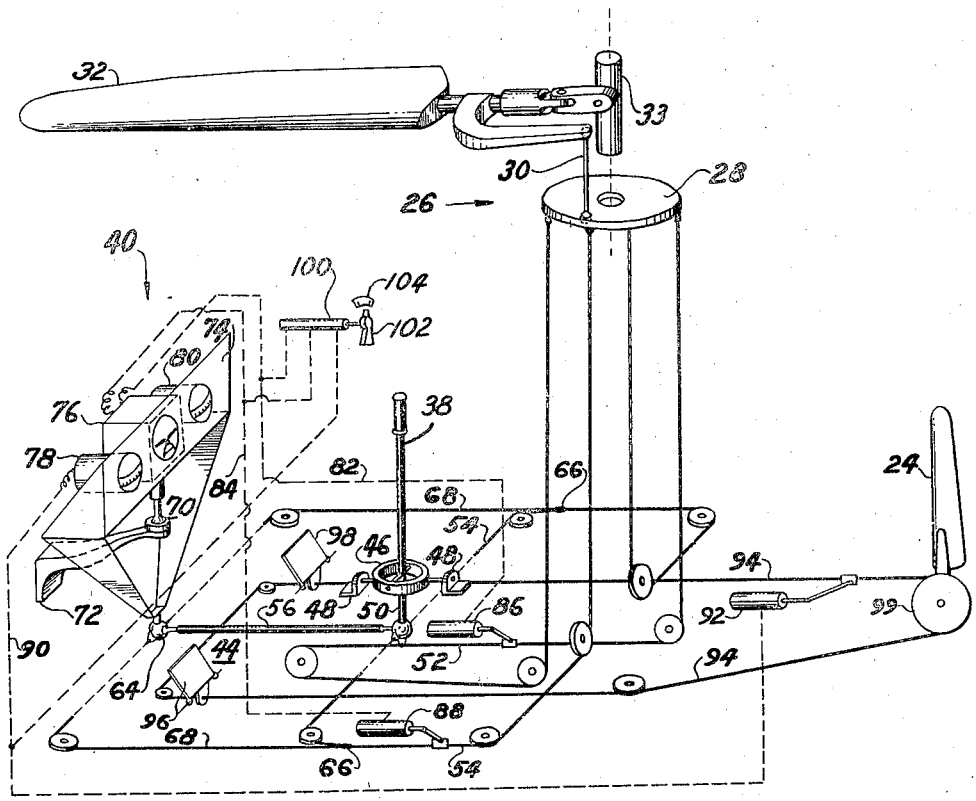
Fig. 2 is a diagrammatic view, partly in perspective, showing the automatic control mechanism linked with the manual control mechanism.

An indicating and controlling mechanism 40 is mounted in the cockpit in front of the pilot's seat 42 in a position in which it can be readily viewed by the pilot at all times. The mechanism 40 is shown as being connected to the control stick 38 by connecting means 44, one form of which will now be described. As shown in Fig. 2, the control stick 38 is mounted in a gimbal joint 46 having its outer ring secured to brackets 48 carried by a part of the body of the helicopter 20. The bottom end 50 of the stick 38 connects to a longitudinal control cable 52 and a lateral control cable 54 having suitable attachments, not shown, of any conventional sort to permit movement in all directions in azimuth. These cables 52 and 54 pass through suitably arranged pulleys up to the tilt plate 28, and are connected thereto so that when the stick 38 is moved forwardly, the tilt plate 28 will be inclined forwardly, for example, and as the stick 38 is moved into any other position within its full range of movement, the tilt plate 28 will take a corresponding position. Thus, as the rotor blade 32 rotates around the shaft 33, it will be cyclically pitched depending upon the direction of the tilt of the plate 28.

Connected to the end 50 upon a universal connection is a push-pull rod 56 which connects at its other end to a universal joint 64 to the indicating and control mechanism 40. The cable 54 is attached by clips 66 to a cable 68 which passes over pulleys and also connects to the mechanism 40. With these connections to the mechanism 40, as the stick 38 is moved in any direction, the mechanism 40 will be moved accordingly, but not necessarily to the same extent.

The mechanism 40 is mounted upon a universal joint 70 carried by a bracket 72 that is secured to the body of the helicopter 20. Thus, if the point 64 of the mechanism 40 is moved in any direction, the entire housing of the mechanism 40 will rotate upon the universal joint 70 to be tilted into a position having a relationship to the position of the control stick 38. The position of the pivot 70 may be different than shown to provide modified stick to housing motions, as desired.

The mechanism 40 has an upper housing 74 containing a vertical indicating gyroscope or the like 76, a directional gyroscope or the like 78, and other indicating or control mechanism 80 which may be used to indicate banks and turns, air speed, motor R. P. M., or any other desirable information.

The vertical gyroscope 76 is connected through suitable control lines 82 and 84 to servomotors 86 and 88 respectively which can position the cables 52 and 54, respectively. The directional gyroscope 78 connects through suitable connections 90 to a servomotor 92 for positioning a cable 94 for controlling the pitch of the torque compensating propeller 24. The manual control means for the propeller 24 comprise foot pedals 96 and 98 carried upon the craft by pivots and connected to the cable 94 to rotate a pitch changing drum 99 to vary the angle of attack of the rotor blades 24. This mechanism may be of the type shown in Igor I. Sikorsky's Patent No. 2,318,259, for example. However, other desired directional control means could be controlled in a similar manner.

A manual switch 100 having a control knob 102 cooperative with an indicating dial 104 is mounted within reach of the pilot upon a fixed part of the craft 20, or mounted in the box 74 as desired. The switch 100 is arranged to turn the automatic pilot means either on or off with respect to the servomotors 86, 88 and 92 for purposes to be hereinafter more fully described.

Figs. 3, 4, 5, 6 and 7 are diagrammatic views showing different portions of the craft in different attitudes, and my invention associated therewith.

Figures 3, 4, 5, 6, 7, 8:
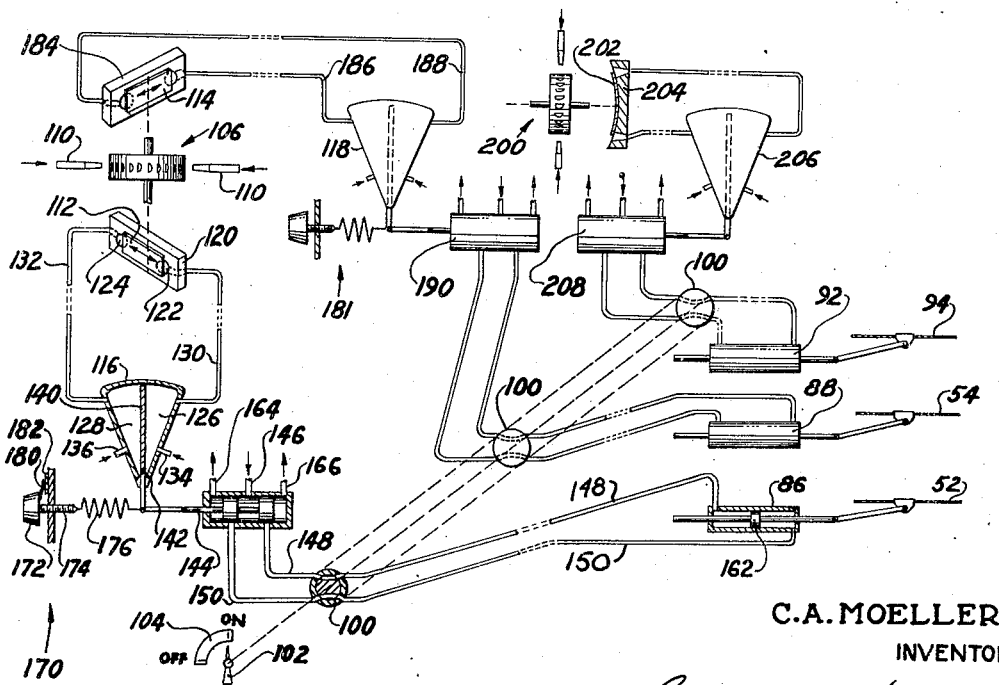
Figs. 3, 4, 5, 6 and 7 are diagrammatic views of portions of a helicopter and of my invention in different attitudes in flight.
Fig. 8 is a diagrammatic view of the automatic control part of one form of my invention employing pneumatic and hydraulic control means.

Fig. 3 shows the helicopter 20 with the control stick 38 in the vertical position, and the rotor 22 substantially in alignment with the horizon so that a vertical line through the tip path plane thereof is normal to the horizon. Actually, the main rotor 22 will be slightly tilted to provide a side thrust to balance translational forces exerted by the torque compensating rotor. Under such conditions, the helicopter will be hovering and remain stationary with respect to the air. The indicating and control mechanism 40 will be in substantially a vertical position and the gyroscope 106 therein will indicate an artificial horizon parallel to the actual horizon line. The gyroscope 106 may carry a horizon line 108 shaded below and clear above (or suitably colored or indicated otherwise) to indicate the horizon line with respect to indicia in the form of an image of a helicopter upon the glass face of the artificial horizon indicating gyroscope 106. Thus, for the hovering condition of the stick 38, the indicator 76 will show substantially the indication of Fig. 3 and the pilot will observe that the attitude of his craft is proper for hovering.

In Fig. 4, the tip path plane of the rotor 22 is inclined forwardly to impart a horizontal force component to accelerate or drive the helicopter 20 forward. In such an attitude, the stick of the helicopter 20 will be inclined forwardly in space in proportion to the inclination of the tip path plane of the rotor 22. In some helicopters, the fuselage 20 flies forwardly in a tail-up attitude as indicated diagrammatically at the top of Fig. 4. However, other rotary wing aircraft fly with the empennage in somewhat different attitudes so it should be understood that the attitude of the control stick 38 is not necessarily in correspondence with a position relative to the body of the craft 20, but takes a position in space relative to the position of the rotor 22 in the craft herein described by way of example. With the stick moved forwardly as shown, the indicating and control mechanism 40 will be tilted so that the glass face of the member 76 will move downwardly with respect to the horizon line 108 carried by the gyroscope 106. Thus, the pilot will observe that the helicopter rotor tip path plane is tilted forwardly and that the craft is in forward motion with respect to the supporting air.

In Fig. 5, the opposite case of that explained in connection with Fig. 4, is illustrated and the helicopter is in rearward motion, or decelerating. For such motion, the rotor 22 is tilted backwardly and a component of force thereof is directed toward the rear. Under such conditions, the control stick 38 is inclined backwardly with respect to a line vertical to the horizon as determined by the gyroscope 106. The face of the vertical gyro 76 will be raised upwardly with respect to the horizon line 108 so that the pilot will know that the tip path plane of the rotor 22 is toward the rear and that he is in backward flight.

In Fig. 6, the condition and attitude of the helicopter when the stick is to the left is indicated, and is exactly opposite to the condition with the stick in the right position as shown in Fig. 7. Inasmuch as these functions are identical, only the stick left condition will be described. With the stick 38 moved to the left, the tip path plane of the rotor 22 will also tip to the left with respect to the horizon. The indicating and control mechanism will be rotated around the universal pivot 70 so that the image of the helicopter carried by the face of the vertical gyroscope 76 will also indicate that the tip path plane is to the left with respect to the artificial horizon line 108 carried by the gyroscope 106. Thus, the pilot of the helicopter 20 will know that his attitude is such as to move the helicopter to the left and can make a correction to trim the ship on course, or, if the automatic mechanism to be described more fully hereinafter is functioning, the automatic control means will act to straighten up the control stick and hence the tip path plane of the rotor 22.

While only five attitudes of flight have been shown and described above, it will be clear that an infinite number of attitudes can be indicated and controlled by the mechanism 40. For example, in a diving bank to the left, a position of the image between that indicated in the lower parts of Figs. 4 and 6 would be seen. In a climbing bank to the right, the indicator would show an image at some point between the images shown in Figs. 5 and 7, for example. Thus, for any of the composite attitudes that a helicopter may take, the indicator carried upon the vertical gyroscope, or the like, will indicate the true attitude of the tip path plane of the rotor 22 with respect to the horizon. Therefore, the craft can be trimmed either manually or automatically so that the force due to gravity acting upon the helicopter will keep the craft in a stable position as desired by the pilot for hovering or for flight in any desired direction. In actual operation of the helicopter, forward flight will, in the large majority of cases, be the only one desired or required; and hence, in the description of the control mechanisms to follow, only the setting for keeping the craft on course in forward flight will be described. However, it will be clear from the description to follow that similar courses can be set in any direction for a craft of the helicopter type.

Referring now to Fig. 8, a fluid pressure operated pneumatic and hydraulic combined control system is shown. The primary indicating element and relay are operated pneumatically by airspun gyroscopes, and the high power servomotors are operated hydraulically. The first stage of control is shown as of the low pressure type working from constant bleed orifices to a low pressure eductor, for example. However, it will be understood that high pressure and electrically operated gyroscopes, and different modes of control can be used in different arrangements of my invention. A gyroscope 106 is spun from air issuing from jets 110, and carries outside the usual gimbal mount a pair of shutters 112 and 114 which control the air supply or bleed to or from pneumatic relays 116 and 118 respectively. The shutters 112 and 114 have been shown in perspective and rotated around 90° for purposes of clarity. In actual practice, the line of connection between the gimbal and the shutter is normal to the plane of the shutter.

Inasmuch as the lateral control by the shutter 114 is identical to the longitudinal control of the shutter 112, only the longitudinal control will be described in detail. As the control stick 38 (Fig. 2) is moved fore and aft in the vertical plane in space, the relative position of the shutter 112 fixed in space by the gyroscope 106 and a portion 120 of the casing of vertical gyro 76 that is fixed with respect to the control stick 38 will have relative movement and one or the other of the bleed ports 122 and 124 will be open and the other of the ports closed. The capacity of bleed or supply from the chamber 126 or 128 through the pipes 130 and 132 will be changed. Each of the chambers 126 and 128 are supplied through flow restrictions 134 and 136 respectively. Thus, as the differential pressure between chambers 126 and 128 is changed, a vane 140 which may move within these chambers will move in one direction or the other. The vane 140 is carried upon a pivot 142 and the lowermost point of the vane 140 will rock back and forth to move a balanced control piston 144. The piston controls flow of fluid from a supply port 146 to one or the other of two control lines 148 and 150 to the servomotor 86.

As the valve 144 is moved to the right, high pressure fluid (such as oil or air, or the like) from a pump, not shown, will flow from the pipe 146 through the pipe 148 through a valve 100 to move a piston 162 within the servomotor 86 toward the right. At this time, the fluid on the right hand side of the piston 162 will flow through the pipe 150, the valve 100 and out of the exhaust vent 164 of the valve 144 back to the sump (or to waste in the case of air). When the piston 162 moves to the right, the cable 52 will be moved to the right also to tilt the tilt plate 28 forward as best shown diagrammatically in Fig. 2. As the valve 144 is moved in the opposite direction, the piston 162 will move in the opposite direction or toward the left and vented oil or air will pass out of a pipe 166.

In order to adjust the control point in the longitudinal direction, an adjustment 170 is provided. The adjustment 170 comprises a manual knob 172 for turning a screw 174 to change the position of a compression-tension spring 176 to vary the point at which the pressures in the chambers 126 and 128 will urge the vane 140 to the neutral position shown. As more tension is placed on the spring 176, it will require a greater pressure in the chamber 126 to urge the vane 140 to the neutral position. Thus, the port 122 will need to be more closed than port 124 with an eductive system, for example, and the gyroscope 106 will be caused to maintain the position of the tip path plane of the rotor 22 through the control cables 52 at some forwardly or rearwardly inclined position which will maintain the helicopter in translation with respect to the supporting air. A pointer 180 may cooperate with a dial carrying suitable speed indicating indicia, for example, so that a manually set speed can be maintained by the helicopter on course.

The lateral control is maintained by the shutter 114 which cooperates with an orifice plate 184 carried by the case of the gyro vertical instrument 76. Control pipes 186 and 188 operate a relay 118 to in turn position a valve 190 to control the action of the servomotor 88 for positioning the lateral control cable 54. The details of construction of the lateral controls are substantially identical to that described in connection with the longitudinal control and hence will not be described in detail. An adjustment 181 may be used to set a lateral course, if desired.

A direction indicating gyroscope 200 may be similar to the gyroscope 106 maintained with its axis in a horizontal indicating direction and shown diagrammatically in plan in Fig. 8. It will be understood that the gyroscope could be a compass or other inertia responsive device, or could be an indicating radio mechanical mechanism for maintaining course. The gyroscope 200 moves a shutter 202 to open or close ports within a portion 204 that moves with the gyroscope case, for example, to position a relay 206 to move a control valve 208, to position the servo 92 and move the cable 94 to control the pitch of a torque compensating rotor 24. The details of construction of the directional control relay and servo-motor is substantially identical to that shown and described in connection with the longitudinal control, and hence will not be described further.

To place the automatic pilot into operation, the control knob 102 is moved to the position shown in Fig. 8. In this position, the several valve elements 100 will be in the position shown to connect the servos 86, 88 and 92 with the control valves 144, 190 and 208, respectively. When the pilot desires to render the automatic control means inoperative, the handle 102 is rotated anticlockwise 90 degrees and the ports in the valve 100 will register with both the pipes leading to the servo-motors so that the servo-motors may move subject only to the resistance of fluid flow through the pipes 148 and 150, for example, in connection with the longitudinal control. This latter function is an additional advantage of that form of the invention shown in Fig. 8 because the servo-motors may serve as dampers of control system vibrations when the control knob 102 is moved to the off position.

Figure 9:
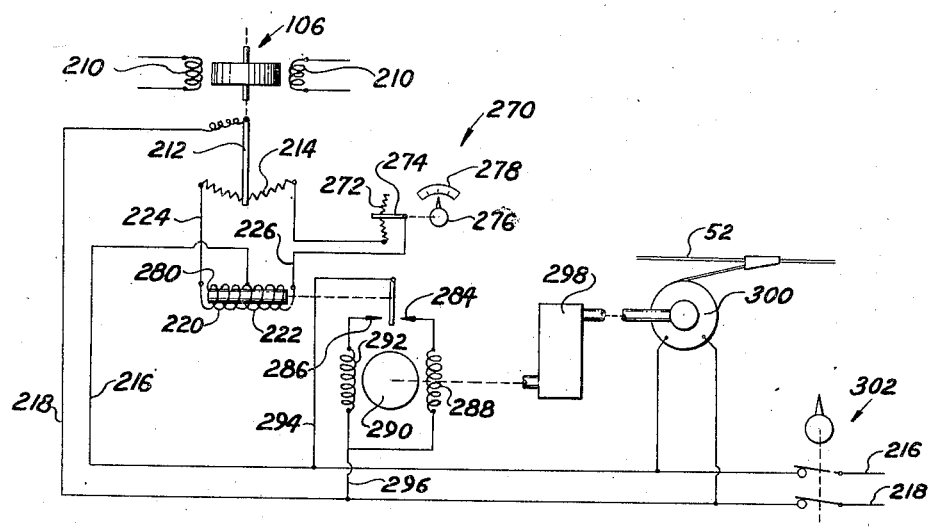
Fig. 9 is a view of a modification of the automatic control system using electrical mechanical control means.

In that form of my invention shown in Fig. 9, the vertical gyroscope 106 is shown as being of the electrically spun type. Field windings 210 may be of high frequency alternating current to rotate the gyroscope 106 at high speed. The balance of the system may be either of A.-C. or D.-C. type without departing from the spirit of the invention. The gyroscope 106, through its gimbals, moves a sensitive pickoff element 212 which may be of the capacitance, inductance, resistance or contact type, or some suitable combination thereof, but shown by way of example as a potentiometer for moving over a variable resistance 214. The potentiometer elements 212 and 214 form a pair of legs of a bridge circuit supplied with electrical energy from line wires 216 and 218 from a suitable source of power not shown. The bridge circuit contains the potentiometer 214 at its one end and a pair of solenoids 220 and 222 at its other end. The flow of energy through the circuit will be from the line wire 216 through either one of the coils 220 or 222 through wires 224 and 226 through the potentiometer 214 and the wiper arm 212 back to the other line wire 218. An attitude controlling and adjusting dial is indicated at 270. This mechanism comprises a variable resistance 272, and a wiper arm 274 moved by a manual dial 276 which indicates the position of the wiper arm 274 in conjunction with an indicator plate 278. The mechanism 270 may be adjusted so that the position of the control stick 38 shown in Figs. 1 and 2 will control the tip path plane of the rotor 22 to place the helicopter 20 in translation with respect to the supporting air.

As the control stick is moved, the potentiometer 214 will be moved so that the wiper arm 212 will move across the potentiometer 214. Thus, the flow of current through one of the windings 220 or 222 will be increased and the other decreased. A core 280 will be moved toward the field of highest energization to move a control arm 282 into contact with one or the other of contacts 284 and 286. The contact 284 will energize a winding 288 driving the motor 290 in a first sense, and the contact 286 will energize the winding 292 to drive the motor 290 in the opposite sense. The circuit to the windings of the motor is from line wire 216 through lead 294, contact arm 282, field windings 288 or 292, and lead 296 back to the other line wire 218. Energization of the motor 290 will operate a gear train 298 to drive a magnetic clutch and sheave 300 to position the cable 52 to tilt the tilt plate 26 and hence the tip path plane of the rotor 22. A switch 302 may be located within reach of the pilot for turning the automatic pilot mechanism on and off.

The lateral and directional controls of that form of the invention shown in Fig. 9 will be substantially identical to that portion which controls longitudinally, and hence have not been shown. It will be clear, however, by analogy and by reference to Fig. 8 showing the pneumatic hydraulic modifications that the other aspects of control will operate substantially identically to the control of the longitudinal attitude of the helicopter.

Figure 10:
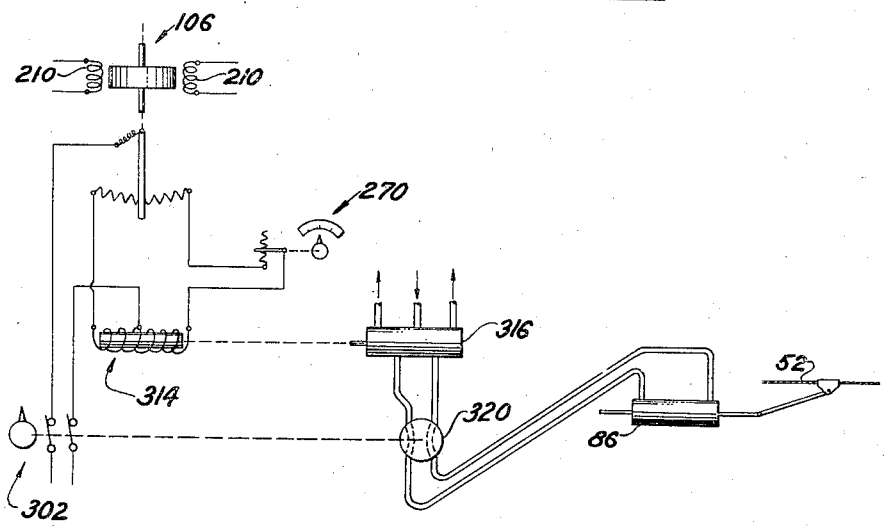
Fig. 10 is a view of a modification of my invention using electrical and hydraulic control means.

In Fig. 10, another form of my invention has been shown which embodies an electrically spun gyroscope 106 identical to that described in connection with Fig. 9. A bridge circuit 314 is identical to that circuit described in connection with Fig. 9 and details thereof will not be repeated. When one of the pilot relay cores is energized more than the other, the plunger therein will be moved in one direction or the other to move a valve 316 which is identical with the valves 144, 190 and 208 described in connection with Fig. 8. As the valve 316 is moved in one direction or the other, the servo-motor 86 will be supplied with high pressure fluid to cause the control cable 52 to be moved to change the tip path plane of the rotor 22 of the helicopter 20. A control valve 320, similar to the valve 100 explained in connection with Fig. 8 is connected with the electrical switch 302 for de-energizing the automatic control system so that when the automatic control system is turned off, the valve will be arranged to connect one side of the piston with the other. The mechanism 270 is identical to that shown and described in connection with Fig. 9 and shifts the longitudinal control point for the gyroscope 106 with respect to the control stick 38 so that the helicopter will be given a translating component of force in a predetermined desired direction. The lateral and directional controls have not been shown in Fig. 10 but may be identical to the longitudinal control and connected to the proper control cables for maintaining a proper attitude for the helicopter.

It should be understood that in rotor systems of the type shown there is a relationship between the cyclic control stick and the tip path plane. For example, when the stick is tilted forward in space, the tip path plane will be inclined forward in space because of the imposed cyclic pitch. As will appear hereinafter, my automatic pilot will maintain the stick and, consequently, the tip path plane in a predetermined space position for a given flight condition. It is characteristic of this system that when the space relationship between the stick and the tip path plane is altered there will be a cyclic pitch imposed on the blades tending to restore the relationship regardless of fuselage position. As the tip path plane returns to its space relationship with response to the stick the amount of cyclic pitch imposed will be decreased, thus decreasing the rate of return and, therefore, tending to damp the restoration action.

*Operation*

In order to better understand the operation of the automatic pilot, the control applied by the operator of a helicopter under flight conditions should be understood. As a general rule a helicopter is not stable in any flight condition and, therefore, may not be flown "hands off." Assume that the ship is proceeding at a certain speed in forward flight and a gust hits the ship to move the nose downwardly, tending to increase the speed of the ship. To maintain the speed constant the stick is moved back to tilt the main rotor back from its original position to decelerate the ship. The nose of the ship will now tend to rise towards its former state and, if the stick is kept in the back position, the nose will overswing. Therefore, the pilot must move the stick back towards the original position as the nose rises, thus anticipating the return to the stable condition. There may be a slight overswing but any such successive oscillations will be damped. An experienced pilot can correct the ship in approximately two oscillations while a wholly inexperienced pilot, on the other hand, might tend to build up progressively larger oscillations which would result in disaster.

It is evident, therefore, that proper control of the helicopter depends upon the pilot's anticipating the return movement of the helicopter towards the desired flight condition and applying the proper corrective forces. My automatic pilot is designed to act in an anticipatory manner in the same way as the pilot but since there is no human element and the action is instantaneous, the automatic pilot operates as well as the most experienced pilot.

In the following description the operation of the fluid operated modification of Fig. 8 will be explained for the hovering, acceleration to forward flight, and stable forward flight conditions. As will be evident, the operation for other flight conditions will follow the same principles. The operation of the modifications of Figs. 9 and 10 also follow the same principles and for this reason a detailed description of the operation of these modifications will not be given. It should be obvious that these modifications merely employ well known equivalent structures. For example, electric relay means are used in lieu of the hydraulic relay of Fig. 8 and, in Fig. 9, an electric servomotor is used in place of the hydraulic servomotor employed in the other modifications.

When the automatic pilot is placed into operation by turning indicator 102 to the "on" position the controls are hydraulically locked against movement by the pilot. If spring 176 is not exerting any force the helicopter will be maintained in the hovering condition. In a steady state of hovering, vane 140 and valve 144 are in the neutral position, servomotor 86 is hydraulically locked, and the control stick 38 and/or platform 40 are in a vertical or neutral position in space. Assume now that a gust exerts a force on the helicopter tending to move the nose of the ship down. Since valve body 120 is carried by platform 40 which is movable in space by the action of the control stick and by the action of the body, there will be relative movement between valve body 120 and shutter 112 which is carried by gyroscope 106 and, therefore, remains steady in space. This relative movement will increase the opening of port 122 and decrease the opening of port 124 causing a pressure differential on vane 140 tending to move the vane in a clockwise direction. This will move valve 144 to the left and allow hydraulic fluid to enter conduit 150 to cause servomotor 86 to move to the left and tilt the swash plates and the tip path plane aft with respect to the drive shaft to correct for the destabilizing force which moved the nose downwardly. At this point, it will be well to consider the action as "frozen" and investigate the condition of the automatic pilot. It will be found that the hydraulic mechanism has returned to an inactive position since the servomotor has moved the controls to cause the tip path plane to exert a force rearwardly. When the controls were moved back the platform and the shutter 40 moved back to its original normal position in space. In this condition, the vane 140 and the valve 144 are in a neutral position and the servo motor 86 is again hydraulically locked. Now then, as the corrective force due to the tip path plane being tilted back begins to take effect the nose of the ship will start to rise. This movement of the ship will cause movement of platform 40 relative to the shutter, exposing port 124 and restricting port 122 to set up a pressure differential on vane 140 tending to move the vane in a counterclockwise direction and valve 144 to the right. As valve 144 moves to the right hydraulic fluid enters servomotor 86 to move the motor and cable 52 to the right to decrease the rearward cyclic pitch, thus anticipating the return of the helicopter to the stable condition. Should the inertia of the body swing the nose up past the stable point, the controls will tilt the tip path plane with respect to the fuselage until the upswing stops and the nose starts to lower, at which time the controls will automatically decrease the amount of forward cyclic pitch in anticipation of the return to thereby damp the oscillations. The process will repeat, if necessary, until the ship has become stable. It must be remembered that the automatic mechanism causes the tip path plane to tilt in anticipation of the return movement of the body and this anticipation, similar to that of a pilot when operating the ship manually, is what makes my device effective as an automatic pilot.

When knob 172 is turned to compress spring 176, the ship will accelerate into a stable, steady, forward flight at a predetermined speed. The speed is dependent upon the amount of force exerted by spring 176. The spring, when compressed, tends to move vane 140 counterclockwise and valve 144 to the right. When valve 144 moves to the right servomotor 86 also moves to the right and tilts the tip path plane forward. This movement will cause the control stick to move and will also move platform 40. The movement of the platform will cause relative movement between the valve body 120 and the shutter 112 to expose port 122 and restrict port 124 to set up a pressure differential tending to move the vane 140 in a clockwise direction in opposition to the force of spring 176. This will tend to return valve 144 to a neutral position since the pressure unbalance equalizes the spring force. However, when the tip path plane is tilted forward the body of the ship will also tip forward after a time lag. This body movement is additive with respect to the relative movement between the valve body and the shutter caused by the forward tilt of the tip path plane and results in the pressure differential on vane 140 exceeding the force of spring 176. This moves vane 140 clockwise and valve 144 to the left to decrease the forward tilt of the tip path plane to correct for the body tilt and allow the helicopter to assume a steady forward flight. If this corrective movement were not applied the ship would continue to tilt at an increasing rate until it goes completely out of control. The corrective control thus applied is the same as that applied manually by a pilot.

When the ship has assumed a steady, forward flight, the pressure differential on vane 140 is just sufficient to overcome the compressive force on spring 176 and vane 140 and valve 144 are in the neutral position. In this condition the control stick and/or the platform are in a space position forwardly displaced from the original vertical or neutral position and the tip path plane is forwardly inclined. It should be noted that the valve body and the shutter are so related with respect to each other as to maintain the pressure differential on the vane 140 in opposition to the force of spring 176. If the nose of the ship now pitches down, port 122 will become further exposed and port 124 will become more restricted, thereby increasing the pressure differential on the vane 140 and causing the vane to move in a clockwise direction and move valve 144 to the left. This will allow the hydraulic fluid to move the servo motor 86 to the left and decrease the degree of forward tilt of the tip path plane to stabilize the ship. Again, as the nose of the ship begins to rise in response to the stabilizing force exerted by the tip path plane, the automatic mechanism decreases the amount of rearward tilt or increases the amount of forward tilt (dependent upon the amount of movement of the controls in stabilizing) in anticipation of the return to the predetermined flight state. Here again, there may be some damped oscillation before stability is reached, but it is impossible for the mechanism to build up progressively larger oscillations due to the fact that the automatic pilot anticipates the return to the stable condition.

The principle of operation of this device is the same for lateral control and for directoral control and the mechanism at all times acts to anticipate rather than lag the movements of the helicopter in returning to the stable condition. It should be understood that my device is also operative on a helicopter equipped, for example, with stabilizing surfaces on the tail cone so that it flies level at all times since the space relationship of the rotor controls with respect to the artificial horizon determines the operating characteristics.

While I have shown different forms of my invention, it will be understood that the different parts could be rearranged under different conditions, as desired, in still other modifications within the scope of the present invention. For example, spring 176 could be eliminated and the length of rod 56 varied by suitable means to determine the forward speed. Also it will be apparent to those skilled in the art that different portions of different rotary wing aircraft could be synchronized with referencing means to obtain automatic piloting functions and to indicate the attitude of the craft, and the invention herein particularly described can be operated without referencing with respect to the manual control stick thereof. For example, as described hereinbefore, the attitude of the fuselage may give a reference in some craft. In others, the rotor drive shaft direction may provide a reference. In still other craft, or the same craft, different physical attributes may provide directional forces indicative of the attitudes thereof. For these reasons, I wish not to be limited in my invention only to those specific forms shown and described, but by the spirit and scope of the subjoined claims.

I claim:

1. In a helicopter, in combination, a rotor including blades, a fuselage and a cyclic pitch control means for said rotor blades, a mounting for said rotor blades including connections responsive to flight forces to maintain a space relation between said control and the rotor tip path plane for a given flight condition, means movable with said control means including mounting means to tilt said movable means in space with movements of said control means, an artificial horizon on said movable means, and means responsive to tilting between said artificial horizon and said movable means due to deviation of said helicopter from said flight condition to actuate said control means to restore the space relationship between the control and the tip path plane and to return said helicopter to the given flight condition.

2. In a helicopter, in combination, a rotor including blades, a fuselage and a cyclic pitch control means for said rotor blades, a mounting for said rotor blades including connections responsive to flight forces to maintain a space relation between said control and the rotor tip path plane for a given flight condition, tiltable means movable with said control means, an artificial horizon on said tiltable means, and means responsive to tilting between said artificial horizon and said tiltable means due to deviation of said helicopter from said flight condition to actuate said control means to restore the space relationship between the control and the tip path plane and to return said helicopter to the given flight condition.

3. In a helicopter, in combination, a rotor including blades, a fuselage and a tiltable cyclic pitch control means for said rotor blades, a mounting for said rotor blades including connections responsive to flight forces to maintain a space relation between said control and the rotor tip path plane for a given flight condition, means movable with said control means including mounting means to tilt said movable means in space with movements of said control means, an artificial horizon on said movable means, and means responsive to tilting between said artificial horizon and said movable means due to deviation of said helicopter from said flight condition to actuate said control means to restore the space relationship between the control and the tip path plane and to return said helicopter to the given flight condition.

4. In a helicopter, in combination, a rotor including blades, a fuselage and a tiltable cyclic pitch control means for said rotor blades, a mounting for said rotor blades including connections responsive to flight forces to maintain a space relation between said control and the rotor tip path plane for a given flight condition, tiltable means movable with said control means, an artificial horizon on said tiltable means, and means responsive to tilting between said artificial horizon and said tiltable means due to deviation of said helicopter from said flight condition to actuate said control means to restore the space relationship between the control of the tip path plane and to return said helicopter to the given flight condition.

5. In a helicopter, in combination, a rotor including blades, a fuselage and a cyclic pitch control means for said rotor blades, a mounting for said rotor blades including connections responsive to flight forces to maintain a space relation between said control and the rotor tip path plane for a given flight condition, means movable with said control means including mounting means to tilt said movable means in space with movements of said control means, an artificial horizon on said movable means, and power means including means responsive to tilting between said artificial horizon and said movable means due to deviation of said helicopter from said flight condition to actuate said control means through said power means to restore the space relationship between the control and the tip path plane and to return said helicopter to the given flight condition.

6. In a helicopter, in combination, a rotor including blades, a fuselage and a cyclic pitch control means for said rotor blades, a mounting for said rotor blades including connections responsive to flight forces to maintain a space relation between said control and the rotor tip path plane for a given flight condition, tiltable means movable with said control means, an artificial horizon on said tiltable means, and power means including means responsive to tilting between said artificial horizon and said tiltable means due to deviation of said helicopter from said flight condition to actuate said control means through said power means to restore the space relationship between the control and the tip path plane and to return said helicopter to the given flight condition.

7. In a helicopter, in combination, a rotor including blades, a fuselage and a cyclic pitch control means for said rotor blades, a mounting for said rotor blades including a flapping hinge, said mounting being responsive to flight forces to maintain a space relation between said control and the rotor tip path plane for a given flight condition, tiltable means movable with said control means, an artificial horizon on said tiltable means, and means responsive to tilting between said artificial horizon and said tilting means due to deviation of said helicopter from said flight condition to actuate said control means to restore the space relationship between the control and the tip path plane and to return said helicopter to the given flight condition.

8. In a helicopter, in combination, a rotor including blades, a fuselage and a cyclic pitch control means for said rotor blades, a mounting for said rotor blades including flapping and drag hinges, said mounting being responsive to flight forces to maintain a space relation between said control and the rotor tip path plane for a given flight condition, tiltable means movable with said control means, an artificial horizon on said tiltable means, and means responsive to tilting between said artificial horizon and said tiltable means due to deviation of said helicopter from said flight condition to actuate said control means to restore the space relationship between the control and the tip path plane and to return said helicopter to the given flight condition.

9. In a helicopter, in combination, a rotor including a blade, a fuselage and a cyclic pitch control means for said rotor blade, a mounting for said rotor blade including connections responsive to flight forces to maintain a space relation between said control and the rotor tip path plane for a given flight condition, tiltable means movable with said control means, an artificial horizon on said tiltable means, and means responsive to tilting between said artificial horizon and said tiltable means due to deviation of said helicopter from said flight condition to actuate said control means to restore the space relationship between the control and the tip path plane and to return said helicopter to the given flight condition.

CONSTAND A. MOELLER.

REFERENCES CITED

The following references are of record in the file of this patent:

UNITED STATES PATENTS

| Number | Name | Date |
|---|---|---|
| 1,993,701 | Avery | Mar. 5, 1935 |
| 2,368,698 | Young | Feb. 6, 1945 |
| 2,384,516 | Young | Sept. 11, 1945 |